United States Patent Office 3,493,548
Patented Feb. 3, 1970

3,493,548
RUBBERY POLYMER COMPOSITION
David Calder Chalmers, Sarnia, Ontario, Canada, assignor to Polymer Corporation Limited, Sarnia, Ontario, Canada, a body corporate and politic
No Drawing. Filed Dec. 23, 1966, Ser. No. 604,133
Claims priority, application Canada, Jan. 17, 1966, 949,962
Int. Cl. C08f 15/18
U.S. Cl. 260—79.7         13 Claims

ABSTRACT OF THE DISCLOSURE

Solid, rubbery copolymers comprising 90 to 99.9 parts by weight of an alkyl acrylate, either alone or in mixtures with alkoxyalkyl or alkylthioalkyl acrylates, and 10 to 0.1 parts by weight of the reaction product of an α-halo aliphatic monocarboxylic acid and a monoolefinically unsaturated monoepoxide demonstrate good oil-resistance and rates of cure.

---

This invention relates to novel rubbery copolymers comprising alkyl acrylates copolymerized with certain derivatives of halo aliphatic monocarboxylic acids.

The rubbery copolymers of the present invention are comprised of (a) about 70–99.9 parts by weight of a reactant selected from (1) $C_5$–$C_{11}$ alkylacrylates and (2) mixtures of said alkyl acrylates with $C_5$–$C_{11}$ alkoxyalkyl acrylates or alkylthioalkyl acrylates wherein the alkyl acrylate forms about 50–90% by weight of said mixture, copolymerized with (b) about 0.1–10 parts by weight of a reactant comprising the reaction product of an α-halo aliphatic monocarboxylic acid with a monoolefinically unsaturated monoepoxide compound of the structure

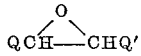

where one of Q and Q' is an unsaturated hydrocarbon radical of 2 to 7 carbon atoms and the other is a hydrogen atom or a saturated hydrocarbon compound radical of 1 to 7 carbon atoms and optionally containing oxygen in the form of an ester or ether linkage and in the case where two hydrocarbon compound radicals are present they may be linked together to form a cycloaliphatic radical.

The acrylate copolymers of this invention have the high resistance to oil characteristic of rubbery acrylate polymers in general and they have good rates of cure. Additionally, they show an advantage in that when 10–40% of the alkyl acrylate is replaced by an alkoxyalkyl acrylate or alkylthioalkyl acrylate the resulting copolymers have improved low temperature properties over the acrylate polymers previously known, while maintaining their high oil resistance. Previously, when attempts were made to improve the low temperature properties of acrylate polymers, such as by partially replacing a lower molecular weight alkyl acrylate with a higher molecular weight alkyl acrylate, there was invariably a concomitant loss in oil resistance.

Alkyl acrylate homopolymers, such as polyethyl acrylate, and copolymers containing a minor amount of polymerized comonomer, such as ethyl acrylate-acrylonitrile copolymer, ethyl acrylate-allyl maleate copolymer and ethyl acrylate-vinyl chloroacetate copolymer are soft, rubbery materials which are capable of being cured i.e. vulcanized to an elastic condition in which they are useful for a number of applications because of their resistance to ultra-violet light, heat, ozone and oils.

Examples of polymerizable alkyl acrylates, containing from 5 to 11 carbon atoms, are ethyl acrylate, n-propyl acrylate, isopropyl acrylate, n-butyl acrylate, sec. butyl acrylate, isobutyl acrylate, n-amyl acrylate and the like. The most preferred acrylate is ethyl acrylate since it imparts the optimum balance of properties and is readily available. It is also within the scope of this invention to utilize mixtures of any of the alkyl acrylates. The copolymer may contain about 35 to 99 percent by weight of polymerized alkyl acrylate but the preferred amount is between 60 and 75 percent by weight. The polymerizable alkoxyalkyl acrylates of ((a)(2) above, containing from about 5 to 11 carbon atoms, include such compounds as methoxymethyl acrylate, ethoxymethyl acrylate, ethoxyethyl acrylate, propoxyethyl acrylate and the like. Ethoxyethyl acrylate is preferred because of its ready availability and ability to produce superior polymers.

The polymerizable alkylthioalkyl acrylates of (a)(2) above, containing about 5 to 11 carbon atoms, are exemplified by methylthio-ethyl acrylate, ethylthioethyl acrylate and methylthiobutyl acrylate. The presence of the alkoxyalkyl or alkylthioalkyl acrylate component greatly improves the low temperature properties of the copolymers of this invention. The copolymer may contain as much as 50 percent by weight of polymerized alkoxyalkyl or alkylthioalkyl acrylate, however, the preferred range is between 25 and 40 percent by weight.

The polymerizable reaction products of (b) above consist of the reaction products of α-halo aliphatic monocarboxylic acids with a mono-olefinically unsaturated monoepoxide. Said epoxide compound has the structure

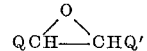

where one of Q and Q' is an unsaturated hydrocarbon compound radical and the other is a hydrogen atom or a saturated hydrocarbon compound radical, said unsaturated and saturated hydrocarbon compound radicals containing from 1 to 7 carbon atoms and optionally containing oxygen in the form of an ester or ether linkage and in the case where two hydrocarbon compound radicals are present they may be linked together to form a cycloaliphatic radical.

Examples of such polymerizable reaction products include the reaction products of chloroacetic acid and glycidyl methacrylate, chloroacetic acid and glycidyl acrylate, chloroacetic acid and allyl glycidyl ether, bromoacetic acid and glycidyl methacrylate, chloroacetic acid and vinyl cyclohexene monoxide and the like.

The reaction product of chloroacetic acid and glycidyl methacrylate contains at least two isomers having the structures with the former predominating,

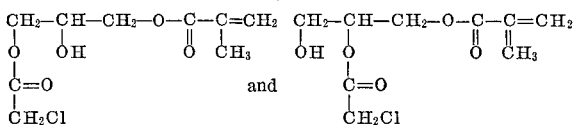

The above reaction products of α-halo aliphatic monocarboxylic acids and monoepoxides are addition products.

The reaction products of α-halo aliphatic monocarboxylic acids with monoepoxides, which may be prepared in the alkyl acrylate comonomer as a solution or separately in the absence of any solvent comonomer, may be further characterized as being compounds composed exclusively of carbon, hydrogen, oxygen and halogen atoms and having a single alkenyl radical separated from a halo-alkyl radical by an intervening oxygen-containing structure. The significance of this juxtaposition of the alkenyl and halo-alkyl radicals lies in the fact that such halo-alkyl alkenyl compounds copolymerize with alkyl acrylates to generate a polymeric chain having haloalkyl radicals as side chains. Other halo-alkenyl compounds not containing oxygen atoms such as vinyl chloride, vinylidene chloride or vinyl fluoride copolymerize with the alkyl acrylates to produce carbon-to-carbon chains having halogen atoms attached directly to the carbon atoms in the main chain. Alkyl acrylate copolymers having side chain halogen substitution can be cured to a soft, strong and rubber-like condition whereas copolymers of alkyl acrylates with such compounds as vinyl and vinylidene halides produce only weak, brittle vulcanizates of little commercial utility.

It is also within the scope of this invention to utilize mixtures of any of the reaction products of α-halo aliphatic monocarboxylic acids and monoolefinically unsaturated monoepoxides. The preferred halogen atoms in the halo-alkyl radical are chlorine and bromine, but fluorine and iodine atoms may also be utilized. The preferred reaction product is the reaction product of chloroacetic acid with glycidyl methacrylate or glycidyl acrylate. The copolymer may contain between about 0.1 and 10 percent by weight of polymerized reaction product but the preferred amount is between 1 and 5 percent by weight.

The presence of the polymerized reaction product of an α-halo aliphatic monocarboxylic acid and a monoolefinically unsaturated monoepoxide permits the use of alkali metal and ammonium salts as curing agents, said salts being preferred to other curing agents of the prior art, such as amines, which have such disadvantages as being toxic, volatile, unpleasant smelling and staining. Examples of such salts, which must be soluble in the copolymer, are sodium carbonate, ammonium acetate, ammonium benzoate, sodium oleate, potassium stearate and the like. The preferred salts are sodium and potassium salts of aliphatic saturated carboxylic acids.

In the practice of the present invention, monomeric mixtures containing one or more monomers from each of the two essential monomer classes (a) and (b) disclosed, are prepared and subjected to polymerization. While the proportion of each of the two essential monomers in the monomeric mixture may vary somewhat, such variation must be within certain definite limits in order to produce rubbery copolymers. For example, the monomeric mixture must contain (a) from about 70 to 99.9 parts by weight of one or more of the alkyl acrylates, or mixtures of said acrylates with alkoxy or alkylthio derivatives of alkyl acrylates, the alkyl acrylate comprising about 50 to 90% by weight of such a mixture and (b) from about 0.1 to 10 parts by weight of one or more of the reaction products of α-halo aliphatic monocarboxylic acids with monoolefinically unsaturated epoxides. It is preferred that the mixture contain from 60 to 75% by weight of alkyl acrylate, 25 to 40% of alkoxyalkyl or alkylthioalkyl acrylate and 1 to 5% of the reaction product of α-halo aliphatic monocarboxylic acids with monoepoxides. If the alkoxy or alkylthio compound is present in an amount greater than 50%, a copolymer is obtained which is deficient in stress-strain properties and in ease of processing while if less than 10% is utilized no significant improvement in low temperature properties is obtained. If the reaction product of α-halo aliphatic monocarboxylic acids with monoepoxides is present in an amount greater than 10% a copolymer is obtained which tends to "scorch" or vulcanize prematurely and is deficient in low temperature properties while if less than 0.1% of this monomer is utilized the resulting copolymer is difficult to cure. In addition to monomers from the two essential classes (a) and (b) disclosed, other copolymerizable comonomers such as acrylonitrile and divinyl benzene, but specifically excluding monoolefinically unsaturated monoepoxides, may be used.

The most preferred polymer of this invention is comprised of ethylacrylate, ethoxy ethyl acrylate, and the reaction product of chloroacetic acid with a monoepoxide compound selected from glycidyl methacrylate and glycidyl acrylate. Such a polymer is particularly useful in such applications as oil seals in automotive transmissions wherein the rubber oil seals are subjected to hypoid lubricants at high temperatures.

The polymerization of the above monomer mixtures may be effected by a number of known methods. For example, polymerization may be effected in solution or in a bulk system by the application of heat or actinic light or without the presence of peroxygen compounds known to initiate polymerization. It is preferred, however, to carry out polymerization of the monomeric mixture in an aqueous emulsion in the presence of an emulsifying agent, a polymerization initiator and, if desired, a polymerization modifier.

Emulsifying agents which may be employed in the aqueous emulsion process include the fatty acid soaps such as sodium oleate, sodium palmitate, and the like, the high molecular weight aliphatic sulfates and the aryl and alkaryl sulfonates such as sodium lauryl sulfate, sodium isopropyl naphthalene sulfonate, and the like as well as the salts of high molecular weight bases such as the hydrochloride of diethylaminoethyloleylamide, cetyltrimethyl ammonium methyl sulfate and lauryl amine hydrochloride.

Polymerization catalysts and initiators useful in any of the polymerization processes include benzoyl peroxide, sodium, potassium and ammonium persulfate, hydrogen peroxide, cumene hydroperoxide, and other peroxygen compounds as well as other types of polymerization initiators such as diazoamino benzene. Those soluble in hydrocarbons are, of course, preferred in the solution or bulk methods while those soluble in water are often preferred in the emulsion method of polymerization.

Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and alkacrylates and may be advantageously employed when a very soft polymer is desired.

In the polymerization of the monomeric mixtures of this invention, permissible reaction temperatures may vary from as high as 100° C. or even higher down to 0° C. or even as low as −10 or −20, though the temperature preferably used is in the range of 20 to 80° C. In aqueous emulsion with temperatures of 20 to 80° C, it is possible to obtain quantitative yields of polymer in from about 1 to about 15 hours.

The preparation of the copolymers of this invention will be more clearly demonstrated in the following examples.

EXAMPLE I

The reaction product of chloroacetic acid and glycidyl methacrylate was prepared as follows. 0.4 part by weight of tetramethylammoniumchloride catalyst and 10 parts by weight of chloroacetic acid were added to a reaction vessel at a temperature of 60° C. 15 parts by weight of glycidyl methacrylate were added over a period of 3 hours to the agitated mixture and the reaction was continued for a further 3 hours, 0.02 part by weight of hydroquinone being present as an inhibitor to prevent polymerization of the reactants and/or the reaction product.

A reactant monomer mixture consisting of 69.0 parts by weight of ethyl acrylate, 29.0 parts of ethoxy ethyl acrylate and 2.0 parts of the above-prepared reaction product of chloroacetic acid and glycidyl methacrylate was polymerized by charging continuously over a period of 4 hours to an oxygen-free reactor containing an agitated solution of 3.0 parts of sodium alkyl aryl sulfonate, 0.03 part of sodium hydrosulfite, 0.5 part of potassium persulfate and 1.0 part of sodium perborate in 250 parts of water maintained at a temperature of 50° C. After all of the reactant mixture had been added the reaction was allowed to continue for a further 2 hour period. The latex was then stripped of any unreacted monomers and the rubbery copolymer in the latex was coagulated and dried.

The dried copolymer was compounded on a two roll mill with 50 parts of HAF carbon black, 1 part of stearic acid, 2 parts of phenyl β-naphthylamine, 2 parts each of sodium stearate and potassium stearate and 0.25 part of sulfur per 100 parts by weight of copolymer. A portion of the compound was tested for scorch characteristics and the remainder was cured and examined for vulcanizate properties.

The vulcanizate was tested for certain physical properties after having been subjected to one of the conditions given below:

(a) initial cure of 30 minutes at 150° C.;
(b) initial cure of 30 minutes and post cure of 24 hours at 150° C.;
(c) post cure and aging for 70 hours at 150° C. in ASTM Oil No. 1;
(d) post cure and aging for 70 hours at 150° C. in ASTM Oil No. 3;
(e) post cure and aging for 70 hours at 150° C. in Hydrocarbon Test Fluid;
(f) post cure and aging in air for 70 hours at 175° C.;

Hydrocarbon Test Fluid is composed of 92% by weight of ASTM Oil No. 1 and 8% of a particular additive, sold under the trade name "Parapoid 10C." The additive is described as a hydrocarbon composition containing sulfur and chlorine constituents of controlled activity towards metal surfaces. The additive is said to contain a minimum of 30% by weight of chlorine and 6% by weight of sulfur.

The letters a–f inclusive are used as abbreviations in this and other examples to indicate the conditions to which test specimens were subjected before physical properties were measured. The compound and vulcanizate properties of the polymer are summarized in Table I.

TABLE I

Scorch: Time to 10 points rise in Mooney at 121° C. (mins.), 3.9
Compression set [Treatment (b)], 72
Gehman T–10 (°C.)[Treatment (b)], −26.0

| Treatment | Tensile strength | Elongation (percent) | 100% modulus (p.s.i.) |
|---|---|---|---|
| a | 1,400 | 400 | 230 |
| b | 1,610 | 300 | 455 |
| c | 1,645 | 270 | 500 |
| d | 1,380 | 280 | 340 |
| e | 1,400 | 270 | 445 |
| f | 1,675 | 210 | 710 |

Gehman T–10 is the temperature at which the torsional modulus is ten times greater than the torsional modulus at room temperature.

These results indicate the polymer has good resistance to aging in air and oils and has excellent low temperature properties. The T–10 value for an ethyl acrylate-vinyl chloroacetate copolymer was only −12° C.

EXAMPLE II

The procedure of Example I was repeated, except that the amount of reaction product of chloracetic acid and glycidyl methacrylate was varied and ethoxy ethyl acrylate was omitted. The monomer proportions are given below:

| | Sample 1 | Sample 2 | Sample 3 | Sample 4 |
|---|---|---|---|---|
| Ethyl acrylate | 99.5 | 99.0 | 97.5 | 95.0 |
| Reaction product of chloroacetic acid and glycidyl methacrylate | 0.5 | 1.0 | 2.5 | 5.0 |

Compound and vulcanizate properties are presented in Table II.

TABLE II

| Property | Treatment | Sample 1 | Sample 2 | Sample 3 | Sample 4 |
|---|---|---|---|---|---|
| Scorch: Time to 10 points rise in Mooney at 121° C. (mins.) | | 22.0 | 14.0 | 6.0 | 2.5 |
| Tensile strength (p.s.i.) | a | 585 | 1,330 | 2,110 | 1,910 |
| | b | 2,645 | 3,450 | 2,060 | 1,840 |
| | c | 1,285 | 1,640 | 1,465 | 2,030 |
| | d | 1,060 | 1,385 | 1,935 | 1,645 |
| | e | 1,255 | 1,545 | 2,100 | 1,980 |
| | f | 1,055 | 1,560 | 2,130 | 1,940 |
| Elongation (percent) | a | 1,200 | 760 | 440 | 290 |
| | b | 740 | 550 | 350 | 220 |
| | c | 560 | 460 | 200 | 250 |
| | d | 800 | 610 | 360 | 250 |
| | e | 740 | 540 | 350 | 210 |
| | f | 535 | 360 | 250 | 200 |
| 100% Modulus (p.s.i.) | a | 130 | 145 | 240 | 560 |
| | b | 405 | 470 | 320 | 700 |
| | c | 200 | 265 | 515 | 680 |
| | d | 120 | 130 | 265 | 550 |
| | e | 140 | 175 | 335 | 765 |
| | f | 205 | 370 | 630 | 910 |
| Compression set | b | 101 | 86 | 70 | 35 |

These results indicate that copolymers having a chloroacetic acid-glycidyl methacrylate reaction product content of between 0.5 and 5.0 parts by weight show satisfactory resistance to ageing. The presence of 2.5–5.0 parts by weight of the reaction product in the copolymer eliminates the absolute necessity of post curing, as shown by the small change in properties between mould cured and post cured vulcanizates of such copolymers.

EXAMPLE III

The reaction product of chloroacetic acid and glycidyl methacrylate was prepared by adding 10 parts by weight of chloroacetic acid, 15 parts by weight of glycidyl methacrylate, 150 parts by weight of ethyl acrylate and 0.4 part by weight of tetramethylammoniumchloride catalyst to a reaction vessel and heating the mixture for 60 hours at 60° C. under good agitation.

The above mixture was diluted with ethyl acrylate until a blend of monomers consisting of 97.5 parts by weight of ethyl acrylate and 2.5 parts by weight of the above described reaction product was obtained. The monomers were copolymerized under the conditions and procedure used in Example I.

The polymer was compounded and tested as described in Example I. The results are presented in Table III.

TABLE III

| Property | Treatment | Sample 1 |
|---|---|---|
| Scorch: Time to 10 points rise in Mooney viscosity at 121° C. (mins.) | | 3.9 |
| Tensile strength (p.s.i.) | a | 2,285 |
| | b | 2,460 |
| | c | 1,935 |
| | d | 1,450 |
| | e | 2,165 |
| | f | 2,220 |
| Elongation (percent) | a | 330 |
| | b | 240 |
| | c | 180 |
| | d | 140 |
| | e | 240 |
| | f | 170 |
| 100% modulus (p.s.i.) | a | 430 |
| | b | 600 |
| | c | 755 |
| | d | 740 |
| | e | 595 |
| | f | 1,035 |
| Compression set | b | 69 |

These results show that the above copolymer has satisfactory resistance to ageing in air and oil. Again, post curing is shown to be not absolutely necessary.

EXAMPLE IV

A procedure similar to that of Example III was used to prepare the reaction product of glycidyl acrylate with chloroacetic acid. 2.35 parts by weight of said reaction product were copolymerized with 97.65 parts by weight of ethyl acrylate under the conditions and procedure used in Example I.

Compound and vulcanizate properties are presented in Table IV.

TABLE IV

| Property | Treatment | |
|---|---|---|
| Scorch; time to 10 points rise in Mooney viscosity at 121° C. (mins.) | | 4.3 |
| Tensile Strength (p.s.i.) | a | 1,975 |
| | b | 2,320 |
| | c | 2,280 |
| | d | 1,775 |
| | e | 2,280 |
| | f | 2,190 |
| Elongation (percent) | a | 430 |
| | b | 310 |
| | c | 270 |
| | d | 300 |
| | e | 350 |
| | f | 230 |
| 100% Modulus (p.s.i.) | a | 240 |
| | b | 395 |
| | c | 500 |
| | d | 310 |
| | e | 355 |
| | f | 775 |
| Compression set | b | 77 |

These results show that a copolymer of ethyl acrylate of the above composition has good resistance to ageing in air and oil.

EXAMPLE V

The procedure of Example I was repeated, except that 15 parts by weight of glycidyl methacrylate were replaced by 13 parts by weight of vinyl cyclo-hexene monoxide in the preparation of the reaction product. 95 parts by weight of ethyl acrylate were copolymerized with 5 parts by weight of the reaction product of chloroacetic acid with vinyl cyclo-hexene monoxide under the conditions and procedure previously described.

Compound and vulcanizate properties are presented in Table V.

TABLE V

| Property | Treatment | |
|---|---|---|
| Scorch: Time to 10 points rise in Mooney viscosity at 121° C. (mins.) | | 11.0 |
| Tensile strength (p.s.i.) | a | 1,830 |
| | b | 1,940 |
| | c | 2,085 |
| | d | 1,645 |
| | e | 2,115 |
| | f | 1,560 |
| Elongation (percent) | a | 250 |
| | b | 230 |
| | c | 170 |
| | d | 200 |
| | e | 150 |
| | f | 110 |
| 100% modulus | a | 560 |
| | b | 850 |
| | c | 1,120 |
| | d | 675 |
| | e | 1,245 |
| | f | 1,275 |
| Compression set | b | 40 |

These results indicate that a copolymer of the above composition has satisfactory resistance to oil.

EXAMPLE VI

The procedure of Example I was repeated, except that 15 parts by weight of glycidyl methacrylate were replaced by 12 parts by weight of allyl glycidyl ether in the preparation of the reaction product. 95 parts by weight of ethyl acrylate were copolymerized with 5 parts by weight of the reaction product of chloroacetic acid with allyl glycidyl ether under the conditions and procedure previously described.

Compound and vulcanizate properties are presented in Table VI.

TABLE VI

| Property | Treatment | |
|---|---|---|
| Scorch: Time to 10 points rise in Mooney at 121° C. (mins.) | | 5.2 |
| Tensile strength (p.s.i.) | a | 2,050 |
| | b | 2,300 |
| | c | 1,870 |
| | d | 1,795 |
| | e | 2,325 |
| | f | 2,305 |
| Elongation (percent) | a | 250 |
| | b | 225 |
| | c | 150 |
| | d | 210 |
| | e | 200 |
| | f | 190 |
| 100% modulus (p.s.i.) | a | 665 |
| | b | 875 |
| | c | 1,130 |
| | d | 685 |
| | e | 1,030 |
| | f | 1,000 |
| Compression set | b | 54 |

These results indicate the above copolymer had a satisfactory resistance to ageing in oil and air.

What is claimed is:

1. A solid, rubbery copolymer comprising about 90 to 99.9 parts by weight of a reactant (a) selected from $C_5$–$C_{11}$ alkyl acrylates and mixtures of said alkyl acrylates with $C_5$–$C_{11}$ alkoxyalkyl acrylates or alkylthioalkyl acrylates wherein the alkyl acrylate forms about 50 to 90% by weight of said mixture, copolymerized with about 10 to 0.1 parts by weight of a reactant (b) comprising an addition product of (1) a saturated α-haloaliphatic monocarboxylic acid and (2) a monoolefinically unsaturated monoepoxide compound of the formula

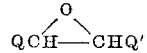

where one of Q and Q' is a monoolefinically unsaturated hydrocarbon radical of 2 to 7 carbon atoms and the other is selected from the group consisting of a hydrogen atom and a saturated hydrocarbon radical of 1 to 7 carbon atoms, or Q and Q' together form a divalent monoolefinically unsaturated hydrocarbon radical of at most 14 carbon atoms, said saturated and unsaturated hydrocarbon radicals optionally containing oxygen in the form of an ether or ester linkage, said reactant (b) having been produced by mixing (1) and (2) in the presence of a catalyst for said addition reaction and a polymerization inhibitor.

2. The copolymer of claim 1 in which the alkyl acrylate is ethyl acrylate.

3. The copolymer of claim 1 in which the alkoxyalkyl acrylate is ethoxyethyl acrylate.

4. The copolymer of claim 1 in which the halo-carboxylic acid is chloroacetic acid.

5. The copolymer of claim 1 in which the epoxide compound is selected from glycidyl acrylate, glycidyl methacrylate, allyl glycidyl ether and vinyl cyclohexene monoxide.

6. The copolymer of claim 1 in which the reactant (a) is a mixture of ethyl acrylate and ethoxy ethyl acrylate and the reactant (b) is the reaction product of chloroacetic acid and glycidyl methacrylate.

7. The copolymer of claim 1 in which the reactant (a) is ethyl acrylate and the reactant (b) is the reaction product of chloroacetic acid and glycidyl methacrylate.

8. The copolymer of claim 1 in which the reactant (a) is ethyl acrylate and the reactant (b) is the reaction product of chloroacetic acid and glycidyl acrylate.

9. The copolymer of claim 1 in which the reactant (a) is ethyl acrylate and the reactant (b) is the reaction product of chloroacetic acid and vinyl cyclohexene monoxide.

10. The copolymer of claim 1 in which the reactant (a) is ethyl acrylate and the reactant (b) is the reaction product of chloroacetic acid and allyl glycidyl ether.

11. A vulcanizate of the copolymer claimed in claim 1 when obtained by heating the copolymer in the presence of an ammonium or alkali metal salt of an organic acid.

12. A solid rubbery copolymer comprising about 95 to 99 parts by weight of a reactant (a) selected from ethyl acrylate and mixtures of ethyl acrylate with ethoxyethyl acrylate wherein the alkyl acrylate forms about 50 to 90% by weight of the mixture, copolymerized with 5 to 1 parts by weight of a reactant (b) comprising an addition product of chloroacetic acid with a monoepoxide selected from glycidyl acrylate, glycidyl methacrylate, allyl glycidyl ether and vinyl cyclohexene monoxide and produced by mixing chloroacetic acid and said monoepoxide in the presence of a catalyst for said addition reaction and a polymerization inhibitor.

13. A vulcanizate of the copolymer claimed in claim 12 when obtained by heating the copolymer in the presence of an ammonium, sodium or potassium salt of a saturated aliphatic monocarboxylic acid of 12 to 18 carbon atoms.

References Cited

UNITED STATES PATENTS

| | | | |
|---|---|---|---|
| 2,575,585 | 11/1951 | Cox et al. | 260—89.5 |
| 3,125,592 | 3/1964 | Nevin et al. | 260—89.5 |
| 3,167,583 | 1/1965 | Goldberg et al. | 260—89.5 |
| 3,224,989 | 12/1965 | Nevin et al. | 260—89.5 |

HARRY WONG, Jr., Primary Examiner

U.S. Cl. X.R.

260—41, 79.5, 80.81, 86.1, 486